March 5, 1957  R. S. WILLIS  2,783,644
APPARATUS FOR MAKING TESTS IN VESSELS AND
CONDUITS CONTAINING FLUIDS
Filed July 28, 1952  4 Sheets-Sheet 3
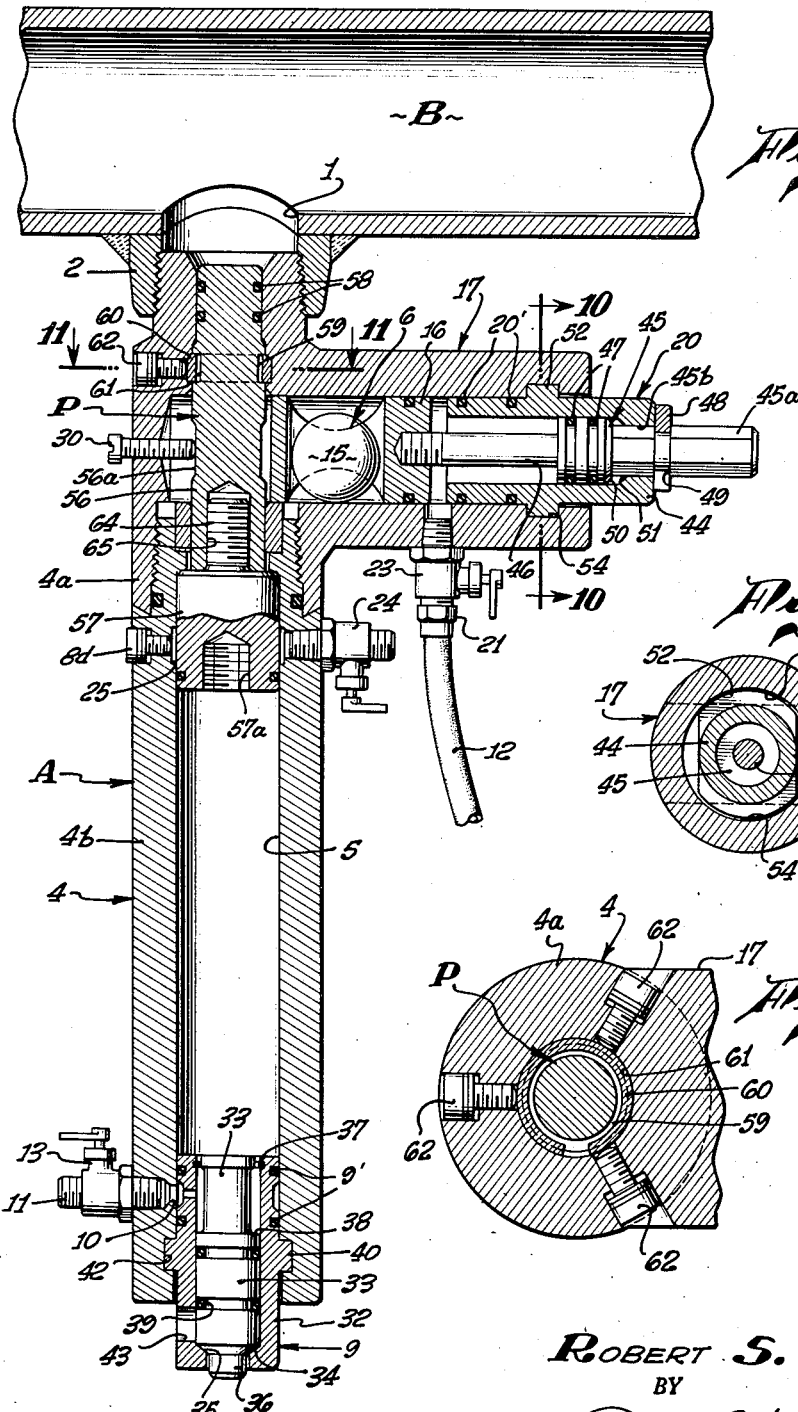
INVENTOR.
Robert S. Willis,
BY
Paul A. Weilein
ATTORNEY.

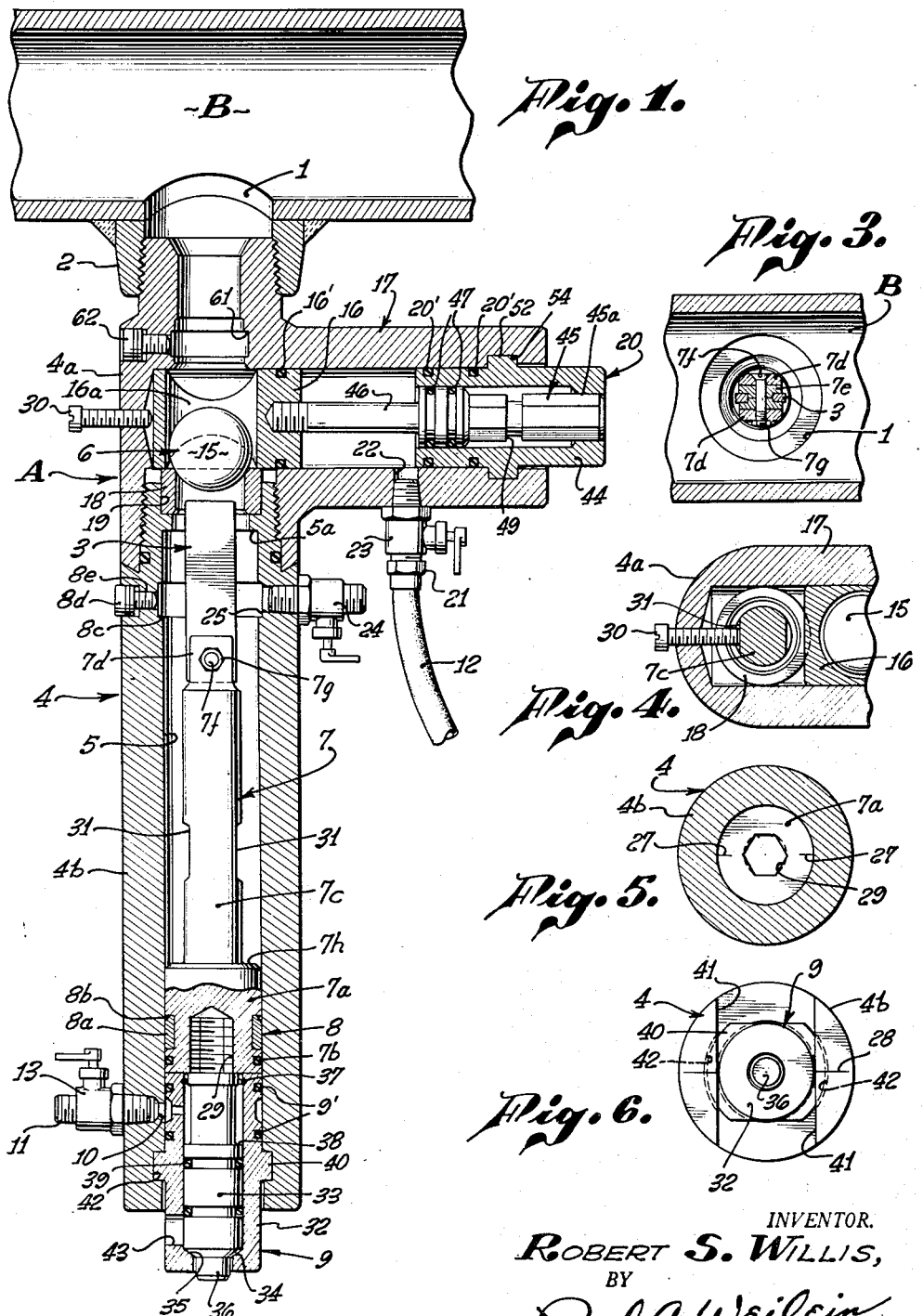

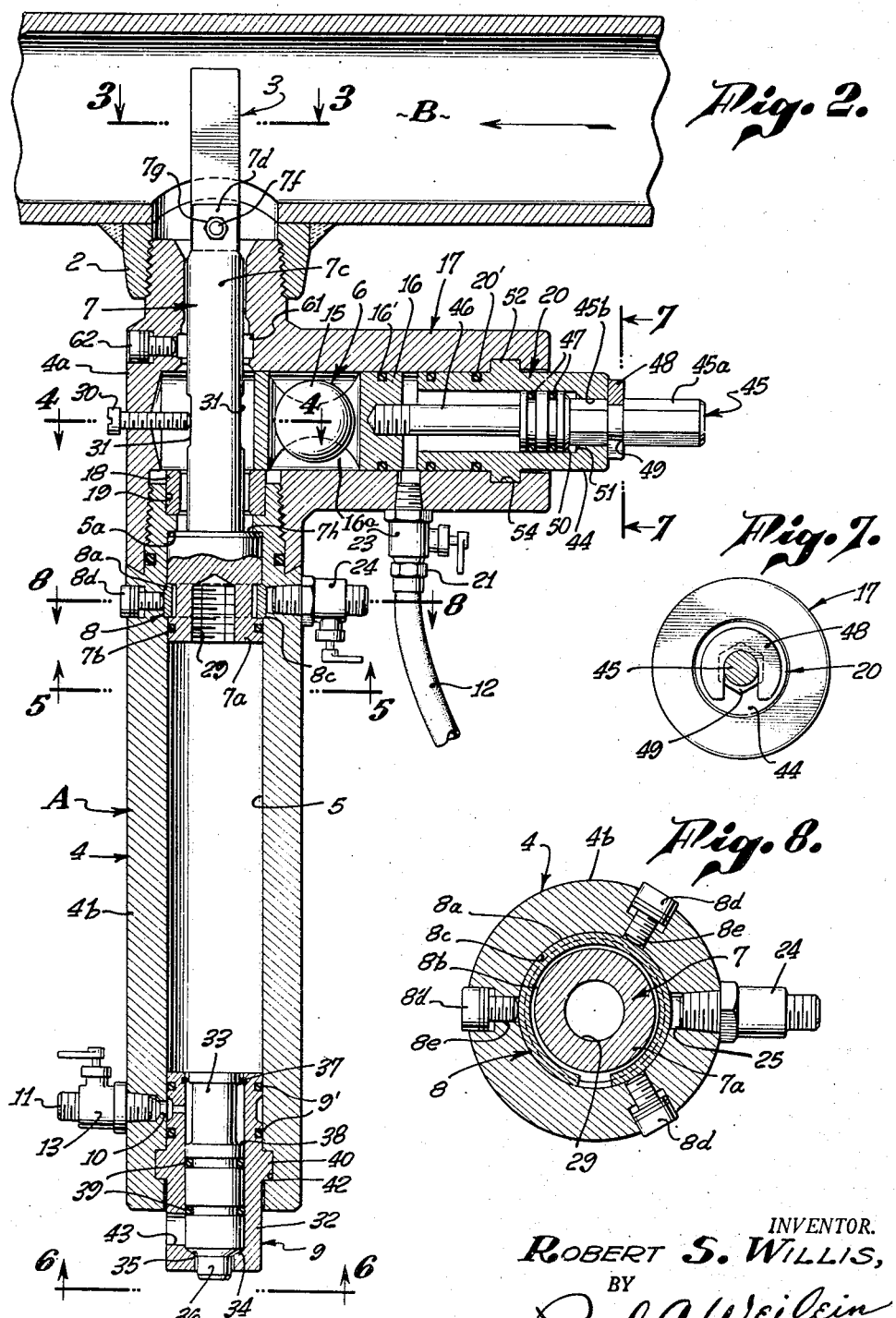

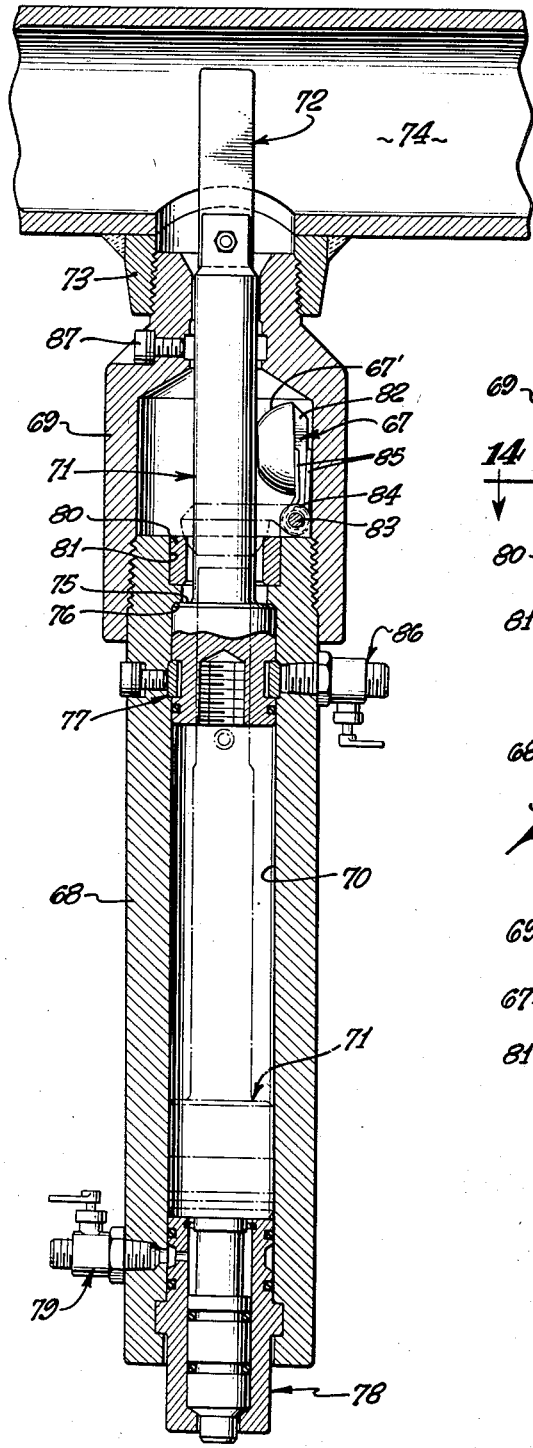
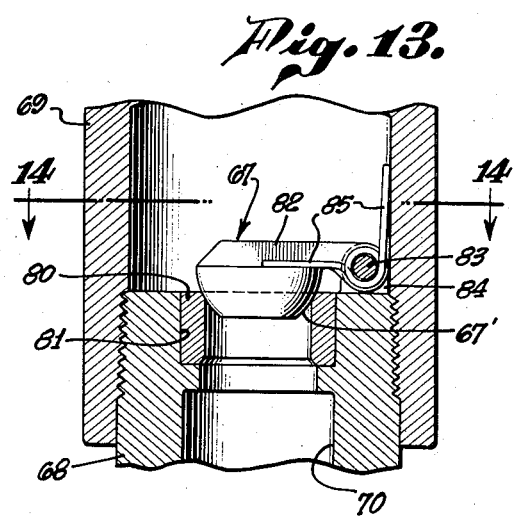
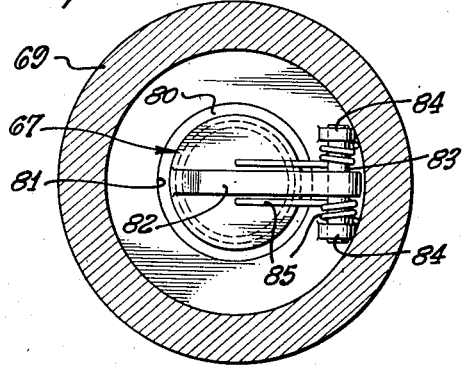

United States Patent Office 2,783,644
Patented Mar. 5, 1957

2,783,644

APPARATUS FOR MAKING TESTS IN VESSELS AND CONDUITS CONTAINING FLUIDS

Robert S. Willis, Long Beach, Calif., assignor to Willis Oil Tool Co., Long Beach, Calif., a corporation of California Application July 28, 1952, Serial No. 301,181

29 Claims. (Cl. 73—86)

This invention relates to the testing of vessels and conduits and the fluids therein, particularly vessels and conduits containing hydrocarbon and other fluids, to determine the nature of the fluids and the effect thereof on the interior of the vessels or conduits.

In the production of crude oil and other fluid petroleum products in relation to oil wells, or in the storage or transmission of these and other fluids, the pipe lines or vessels therefor are subjected to erosion and other damage, due to acidity of the fluids, electrolysis, turbulence, and other effects of such fluids. Thus, it becomes necessary to replace the lines or vessels from time to time to prevent costly as well as hazardous escape of fluid, which may be occasioned by failure of the lines.

Heretofore, the rate and extent of this damage of the lines or vessels could be ascertained only by taking down the lines or uncoupling the vessels for inspection of the interior thereof. Such inspections are objectionable in that they result in costly shut-downs and curtailment of scheduled production.

Accordingly, it is an object of the present invention to provide for making tests in fluid lines and vessels without causing leakage of the fluid or interfering with scheduled production or transmission of the fluid.

It is another object object of this invention to provide for the making of the tests such as described, in a manner whereby proper corrective measures may be taken, or the vessels or lines replaced before they become damaged to the extent making them unfit or unsafe for use.

It is an additional object hereof to provide apparatus of a simple and inexpensive nature making it possible to make tests of the character described which will be conclusive and reliable as to the exact condition of the interior of the vessel or pipe lines, without interfering with the flow of fluid or causing leakage thereof.

It is a further object to provide testing apparatus for the purpose described which readily may be installed at any desired point in pipe lines or vessels to be tested and operated at will to make the desired test without interfering with the flow through the lines or vessels.

An additional object hereof is to provide apparatus such as described which takes up but little space and after installation will remain in connected relation with the vessel to be tested, inasmuch as it will not interfere with transmission of fluid when inoperative as well as when operative.

It is another object hereof to provide for the insertion of a testing element into a pipe line or other vessel containing static fluid or fluid under pressure and for removing the test element without leakage of the fluid or interference of the flow thereof through the line.

A further object of this invention is the provision of apparatus for the purpose described which is adapted for actuation over fluid pressure in excess of the pressure in the line or vessel, for effecting the placement and removal of the testing element.

This invention possesses many other advantages and has other objects which may be made for easily apparent from a consideration of several embodiments of the invention. For this purpose there are shown two forms in the drawing accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is a longitudinal sectional view of apparatus embodying the present invention, as installed on a pipe line, the testing element being shown in the inoperative position from which it may be inserted into testing position and from which it may be removed from the apparatus after the test;

Fig. 2 is a sectional view similar to Fig. 1, showing the testing element in testing position;

Fig. 3 is a fragmentary cross sectional view taken on the line 3—3 of Fig. 2;

Fig. 4 is a cross sectional view taken on the line 4—4 of Fig. 2;

Fig. 5 is a cross sectional view taken on the line 5—5 of Fig. 2;

Fig. 6 is an elevational view of the outer end of the apparatus, looking in the direction of the arrows from the line 6—6 in Fig. 2;

Fig. 7 is a sectional view taken on the line 7—7 of Fig. 2;

Fig. 8 is a cross sectional view taken on the line 8—8 of Fig. 2;

Fig. 9 is a longitudinal sectional view similar to Fig. 2, showing a plug element mounted in the apparatus, to permit of partial disassembling and reassembling thereof for replacing worn parts;

Fig. 10 is a cross sectional view taken on the line 10—10 of Fig. 9;

Fig. 11 is a sectional view taken on the line 11—11 of Fig. 9;

Fig. 12 is a sectional view similar to Fig. 2 of a modified form of this invention;

Fig. 13 is a fragmentary sectional view on an enlarged scale of the valve shown in Fig. 12, in closed position, and Fig. 14 is a sectional view taken on the line 14—14 of Fig. 13.

Testing apparatus A embodying the present invention, in the form shown in the accompanying drawings, is adapted to be connected with a vessel, for example a pipe line B for containing or conducting crude oil or other fluids having characteristics which cause erosion and other damage of the line. However, it should be understood that this apparatus may be used for making tests of any fluid contained in storage or transmission vessels, as well as tests to determine the condition of the interior of such vessels.

Connected as here shown with the line B, the apparatus A may be operated at will to make tests as to the nature of the fluid in the line and to determine the damage done to the line whereby corrective measures may be taken or the line replaced before becoming unfit for use.

The line B is prepared, while empty, for attachment of the apparatus A, by forming an opening 1 in the side of the line and welding thereto in registration with the opening, a nipple 2, whereby the apparatus A may be detachably connected therewith.

The apparatus A provides for the introduction of a testing element 3 into the line B and for the removal of this element for inspection to determine the value of the test, without causing any leakage or interference with the flow of fluid in the line.

In the present instance, the testing element 3 is in the form of a metal plate of the same composition and thickness as the metal forming the pipe line B, whereby the action or effect of the fluid on the plate will correspond to the action or effect of the fluid on the pipe line. Thus, after the testing element 3 has been positioned in the line for a predetermined length of time constituting a test period, it may be removed for inspection to determine the effect the particular fluid is having on the metal of the line B whereby corrective measures may be taken for preventing damage to the extent making the line unfit for use.

In accordance with this invention, provision is made for introducing the testing element 3 into the line B under a force in excess of the fluid pressure in the line B, and for releasably holding the testing element in testing position, so that upon release thereof, the fluid pressure in the line may be utilized to move the testing element out of testing position.

Accordingly, the apparatus A provides a tubular body structure 4, the bore of which forms a valved passage 5 in direct communication with the interior of the pipe line B, and through which the element 3 may be moved into and out of testing position, without causing leakage of the line fluid or interference with the flow thereof.

As here shown, the movement of the testing element 3 into testing position and the operation of the valve means 6 in the passage 5, are effected by the application to the passageway and valve means respectively, of fluid under a pressure in excess of the fluid pressure in the line B.

As a means for supporting the testing element for movement into and out of testing position, a piston-like carrier 7 is operable in the passage 5 and may be removed for inspection of the test element 3 and replaced therein with the same test element or a fresh test element, as desired.

The valve means 6 is arranged to open and close the passage 5 to permit insertion of the test element 3 into the line B as well as the removal of the test element from the line and subsequent removal thereof from the passage 5, in all instances, without permitting leakage of fluid from the line.

When the carrier 7 with the testing element 3 thereon is disposed in the inoperative position in the passage 5 as shown in Fig. 1, the valve means 6 is positioned to close the passage between the element 3 and the pipe line B. This is also the valve position and the position of the carrier as required to remove the test element from the passage.

When it is desired to introduce the element 3 into the line B, the valve means 6 is moved to the position opening the passage 5 as shown in Fig. 2, and fluid under pressure is then applied to the passage behind the carrier 7, to move the carrier into the position placing the testing element 3 within the pipe line.

Upon movement of the carrier 7 into position to dispose the testing element in the line B, a releasable locking means 8 automatically locks the carrier against being forced out of position by the line pressure, whereupon the fluid pressure behind the carrier in the passage 5 may be released. However, the pressure fluid behind the carrier may be retained in the passage subject to being relieved as necessary to contact the removal of the carrier from testing position under the force of the line pressure, as will be hereinafter described.

Upon release of the locking means 8, the line pressure will force the carrier 7 outwardly in the passage 5, thereby removing the testing element from the line B. This movement may be controlled by appropriate bleeding of the pressure behind the carrier to prevent the line pressure from slamming the carrier against the closure plug 9 at the outer end of the passage 5. This bleeding of the pressure from behind the carrier 7 is effected by valve means 13 controlling a port 10 in the wall of the passage 5. After this retraction of the carrier 7 and test element 3, the valve means 6 is operated to close the passage between the element 3 and the pipe line as shown in Fig. 1, whereby the carrier and the testing element 3 may be removed for inspection of the testing element in a manner to be hereinafter described.

It should be noted that the valve means 6 is urged into seated position closing the passage 5 by the pressure of the fluid in the line B. Moreover, as here shown the line pressure assists in moving the valve means 6, to open the passage 5, once the valve means is unseated by a fluid pressure applied in the passage 5 between the valve means and the testing element 3 when the carrier is positioned as shown in Fig. 1.

The body member 4 as here shown consists of threadedly connected, tubular sections 4a and 4b, in which the section 4a is screwed into the nipple 2, and the bores in said sections form the passage 5. Thus, the body structure may be economically made of sections of pipe or tubing. The section 4b forms a cylinder for the piston-like carrier 7, and the outer end thereof is closed by the removable plug 9 having sealing rings 9' thereon. Removal of this plug provides for inserting and removing the carrier 7 with testing element 3 thereon.

Fluid under pressure in excess of the pressure in the line B, for moving the carrier 7 to position the testing element 3 in the line B, is introduced into the passage 5 behind the carrier through the port 10 in the section 4b of the body structure 4. A valved fitting 11 is connected with the port 10 and provides for the detachable connection thereto of a hose 12 for applying thereto, fluid under pressure from a suitable source, not shown. Opening of the valve 13 in this fitting when the hose 12 is detached therefrom provides for relieving the fluid pressure from the passage 5, so that when the locking means 8 is released, the line pressure will move the carrier 7 according to the relief of pressure through the valve 13, to withdraw the element 3 from the line B.

The valve means 6 as here shown includes a ball valve 15 mounted in a piston-like cage 16 slidable in a tubular extension 17 of the section 4a of the body structure 4. The bore of this extension opens at one end into the passage 5 whereby the cage 16 may be moved into and out of position causing the ball valve 15 to seat against a valve seat 18 mounted in a counterbore 19 in the adjacent end of the body section 4b. The outer end of the bore through the tubular extension 17 is closed by a removable plug 20 having sealing rings 20' thereon.

Fluid under pressure in excess of the line pressure, for moving the valve cage 16 to seat the ball valve 15, is introduced through a valved fitting 21 connected with a port 22 in the extension 17. Thus, the extension 17 serves as a cylinder in which the cage 16 having a sealing ring 16' thereon acts as a piston. When the fluid is introduced through the port 22, the cage 16 is moved from retracted position shown in Fig. 2 into position seating the ball valve 15 against its seat 18 as shown in Fig. 1. In this connection it should be noted that the cage 16 is formed with a through opening 16a extending axially of the passage 5 whereby the ball valve 15 is movable in this opening transversely of the cage and axially of the passage 5, into and out of contact with the seat 18. The valve 23 in this fitting 21 provides for a bleeding of the operating fluid from the bore of the extension 17 whereupon the pressure from the line B will hold the valve seated.

The unseating of the ball valve 15 is effected by introducing fluid under pressure, in excess of the line pressure, through a valved fitting 24 corresponding to the fittings 11 and 21 and connected with a port 25 provided in the body section 4b so that the pressure may be applied against the side of the ball valve opposite that opposed to the line pressure. This will cause the ball valve 15 to be moved away from the seat 18 in a direction transversely of the valve cage 16, and when the ball valve is thus moved into a position substantially aligned with the bore of the extension 17, the line pressure urges the cage 16 and the ball valve outwardly into retracted position as shown in Fig. 2. This outward movement of the cage 16 may be controlled by bleeding the pressure in the bore of the extension 17 through the valve 23.

As here provided, the carrier 7 has a head 7a provided with sealing rings 7b and serving as a piston in the passage 5, the remaining portion 7c of the carrier being of such smaller diameter than the head, that fluid pressure from the line B will be effective against the head to move the carrier in the passage 5.

On the free end of the carrier portion 7c are a pair of opposed apertured ears 7d between which a pair of washers 7e are urged to clamp and detachably hold the testing element 3 on the carrier, by means of a bolt 7f and a nut 7g. The washers are made of insulation material to prevent electrolytic attack.

The locking means 8, as here shown, comprises a snap ring 8a normally compressed within a groove 8b in the head 7a of the carrier, by contact of the ring with the wall of the passage 5. However, when the carrier 7 is moved to position the testing element 3 in the line B, a shoulder 7h formed by the head 7a contacts a shoulder 5a on the wall of the passage 5 and limits the movement of the carrier so that the snap ring 8a comes into alignment with and will snap into a groove 8c in the wall of the passage 5, but will remain partly in the groove 8b, as shown in Figs. 2 and 8, thereby locking the carrier in testing position.

Release of the snap ring 8a from locking engagement in the groove 8c is effected by means of a plurality of screws 8d adjustable in threaded openings 8e in the body member 4, the inward advancing of these screws causing them to contact and force the snap ring 8a out of the groove 8c into the groove 8b, whereupon the line pressure may be employed as hereinbefore noted to move the carrier 7 out of testing position.

In order that it may be determined in what angular position the testing element is disposed in the line B, the outer end of the piston head 7a is provided, as shown in Fig. 5, with radial graduations or markings 27 indicative of the angular positions of element 3 and adapted to be read in connection with index markings 28 (see Fig. 6) on the outer end of the section 4b of the body structure. This reading may be effected when inserting the carrier into the passage 5 by correlating the markings 27 with the index marks 28.

In this connection, it should be noted that the piston head 7a is provided with a socket opening 29 of hexagonal cross section having mutilated screw threads, whereby when the plug 9 is removed, any suitable rod or bar, not shown, having a similarly screw threaded end, may be inserted into the passage 5 and into the opening 29 for turning the carrier 7 to position the element 3 as desired, or threaded into the opening for removing the carrier and element 3 from the passage 5.

A set screw 30 is mounted on the body section 4a so that it may be adjusted to engage either one of a pair of flattened surfaces 31 on the portion 7c of the carrier, to hold the carrier against turning out of a position maintaining the element 3 in the desired position in the line B. This set screw is retracted so as to clear the passage for inserting and removing the test element.

When the carrier 7 is in its retracted position as shown in Fig. 1, it may be removed by the aforesaid bar or rod which may be screwed into the opening 29, after removal of the plug 9. The frictional contact of the snap ring 8a with the body section 4a is sufficient to restrain turning of the carrier about its axis, whereby the aforesaid bar or rod may be threadedly coupled to the carrier.

It is desired to make certain that no appreciable fluid pressure is present in the passage 5 between the carrier 7 and the plug 9, before removing the plug to gain access to the carrier for adjustment or removal thereof. Accordingly, the plug 9 is provided with means for determining the presence or absence of fluid under pressure between the plug and the carrier 7, and to this end, the plug includes a tubular shell 32 and a core 33 movable axially therein. Shoulders 34 and 35 on the core 33 and the shell 32 respectively, are cooperable to limit the movement of the core in an outward direction. A reduced outer end 36 of the core projects beyond the outer end of the shell. A snap ring 37 in the bore of the shell 32 is adapted to be engaged by a shoulder 38 on the core 33 to limit inward movement of the core relative to the shell. Leakage between the core and shell is prevented by sealing rings 39 on the core.

It will now be apparent that in order to determine whether or not any fluid pressure is present in the passage 5 between the plug 9 and the carrier 7 when the latter is in extended position, as shown in Fig. 2, pressure is applied by any suitable means, such as by pressing a bar or rod, not shown, against the reduced end 36 of the core 33. If the core 33 can be pushed inwardly, readily, this indicates the absence of pressure fluid between the core and the carrier 7. If it is determined that pressure fluid is present, it may be relieved by opening the valve 13 in the fitting 11, thereby making it safe to remove the plug 9 in order to remove the carrier 7 and the testing element 3 thereon.

In this connection it should be noted that the shell 32 of the plug 9 is provided with lugs 40 for releasably locking the plug in the outer end of the section 4b of the body structure 4. The section 4b is provided with entrance slots 41 leading into a groove 42 in the wall of the passage 5, whereby the lugs 40 may be moved into the groove, and the plug 9 then turned about its axis to move the lugs 40 into locking position in the groove 42. This turning of the plug to lock or release it may be effected by inserting a bar or rod, not shown, in any opening 43 in the side of the shell 32, whereby sufficient leverage may be applied for easily turning the plug, it being possible to use the same tool for this purpose as employed to push against the core 33 in making the pressure test hereinbefore explained.

The plug 20 is also provided with means to test the bore of the extension 17 between the plug and the valve cage 16, to determine whether or not pressure fluid is present therein. This test is necessary to ascertain whether the valve cage 16 and the ball valve 15 therein, safely may be removed from the extension 17 for inspection or replacement of the ball valve, while allowing the body section 4a to remain in connected relation with the pipe line B, with a sealing plug P therein as shown in Fig. 9. With the plug P in place in the body section 4a, the section 4b may be removed to gain access to the valve seat 18 for replacement thereof, in a manner which will be hereinafter fully described. Accordingly, the plug 20 comprises a tubular shell 44 and a movable core 45 similar to the shell 32 and core 33 of the plug 9. The core 45 however, is provided with a rod-like extension 46 threadedly connected with the valve cage 16. Sealing rings 47 on the core 45 prevent escape of fluid between the core and the shell 44.

When the ball valve 15 is in position to open the passage 5 as shown in Fig. 2, a portion 45a of the core 45 is extended beyond the outer end of the shell 44. The valve 15 and the core may be held in this position by means of a U-shaped key 48 (see Fig. 7) which is removably engaged in a groove 49 in the core portion 45a, and abuts the outer end of the shell 44.

With reference to Fig. 2 it is seen that the core 45 and the cage 16, readily may be pushed inwardly a limited extent if no fluid under pressure is between the plug and the cage. If fluid under pressure is present, it may be relieved by opening the valve 23 in the fitting 21. Cooperable shoulders 50 and 51 on the shell 44 and core 45 limit outward movement of the core.

The releasable locking of the core 20 in the bore of the member 17, is effected by means of lugs 52 on the shell 44, being inserted through entrance slots 53 in the shell so as to engage in a groove 54 in the bore of the shell, in the same manner as with the plug 9. Turning of the plug 20 to lock and release it is effected by applying wrench or suitable tool to the portion 45a of the core 45, which portion is of non-circular cross section and slidable in the similarly formed opening 45b at the outer end portion of the bore of the extension 17.

Referring to Figs. 9, 10 and 11, it will be seen that the plug P is inserted into the apparatus A instead of the carrier 7, to prepare the apparatus for removing the ball valve 15 and its seat 18, for inspection or replacement thereof.

The plug P is inserted in the passage 5 and then moved into position to plug the passage 5 in the body section 4a in the same manner that the carrier 7 and the testing element 3 are inserted into the passage 5 and moved into testing position.

Accordingly, the plug P comprises a plug portion 56 and a detachable piston-like head 57, similar to the portion 7c and head 7a of the carrier 7, as to length and diameter. The plug portion 56 carries sealing rings 58 for engaging the wall of the passage 5 in the body section 4a to seal the passage 5 in this body section. The portion 56 also carries in a groove 59 therein, a snap ring 60 corresponding to the ring 8a, for locking engagement with a groove 61 in the section 4a, to lock the plug P in place in the same manner as the carrier 7 is locked by the locking means 8. Screws 62 on the body section 4a are operated in the same manner as the screws 8d, to move the snap ring 60 out of locking engagement with the groove 61, to release the plug P.

The head 57 of the plug P acts as a piston in the passage 5 of the body section 4b and is identical with piston-like head 7a of the carrier 7 except that it does not carry a locking ring like the ring 8a, and is provided with a reduced threaded extension 64 threaded into an opening 65 in the plug portion 56.

When it is desired to remove the ball valve 15 and its seat 8 in order to replace these parts, the carrier 7 with the testing element 3 thereon is removed in the manner hereinbefore described, and the plug P is inserted into the passage 5, and moved as hereinbefore noted into position shown in Fig. 9, to plug this passage in the body 4a, being automatically locked in this position by the snap ring 59.

Following this placing of the plug P, the bore of the tubular extension may be tested to determine whether or not any fluid pressure is present therein and if no pressure is present, the plug 20 is removed, thereby also removing the valve cage 16 and the ball valve 15.

Next, to remove the valve seat 18, the set screw 30 is advanced into contact with one of the flat surfaces 56a on the plug portion 56, to hold this plug portion against angular movement about its axis, whereby the head 57 may be unscrewed and detracted from the plug portion 56. This removal of the head 57 may be accomplished by removing the plug 9 and inserting a bar or rod, not shown, which is adapted to be threadedly connected with a screw threaded opening 57a in the head 57, whereby the head may be unscrewed and withdrawn from the passage 5. After removing this head, the body section 4b is unscrewed from the section 4a thereby providing access to the valve seat 18.

In order to remove the plug portion 56 in preparation for reassembling the apparatus, it is necessary to insert the valve cage 16, ball valve 15 and the plug 20 in the bore of the extension 17 and lock the plug in place with the ball valve in retracted position, as shown in Fig. 9. It is also necessary to recouple the body section 4b to the body section 4a, with the valve seat 18 and the plug 9 in place on the section 4b.

Next the set screw 30 is turned to release the plug portion 56 and the screws 63 are advanced to depress the locking ring 60, thereby releasing the plug portion 56, whereby the pressure in the line B will be effective to move the plug portion 56 into the section 4. The plug portion 56 may be removed from the passage 5 by inserting a bar into the passage and threading it into the opening 65 in the end of the portion 56, in the same manner as in removing the head 57. However, before removing the plug portion 56 from the passage 5, the ball valve 15 is seated and the plug 9 is then removed. After removal of the plug portion 56, the carrier 7 with the element 3 thereon may be inserted into the passage 5, and the plug 9 replaced, thereby making the apparatus ready for testing operations in accordance with this invention.

A modified form of this invention as shown in Figs. 12, 13 and 14, differs from the apparatus shown in Figs. 1 through 8, in that it is provided with a flap valve 67 instead of the ball valve and cage structure in the first described form of this invention.

Accordingly, this modified form includes a tubular body structure consisting of a pair of tubular sections 68 and 69 detachably threadedly connected to form a passage 70 for reception of a carrier 71 and a test element 72 identical with the carrier 7 and test element 3. The section 69 is connected with a nipple 73 on the side of the conduit 74 whereby the test element may be inserted into and withdrawn from the conduit.

The inward movement of the carrier 71 properly to position the test element 72, is limited by means of the shoulders 75 and 76 on the carrier and on the wall of the passage 70 respectively, in the same manner as in the first described form of this invention. Also, the carrier 71 is releasably locked in position to dispose the test element in the conduit, by releasably locking means 77 corresponding to the locking means 8.

A plug 78 removably mounted in the outer end of the section 68, is identical with the plug 9 and closes the passage 70 so that fluid under pressure may be introduced into the passage through the valved fitting 79 for moving carrier 71 to position the test element 72 in the conduit 74.

The flap valve 67 is in the form of a disk having a spherical surface 67' adapted to seat on a tubular seat member 80 mounted in a counterbore 81 at the inner end of the body section 68. An arm 82 is fixed to the back of the valve 67 and pivoted as at 83 between ears 84 on the body section 69. A spring 85 is mounted on the valve pivot and has portions thereof engaged with the back of the valve and the wall of the section 69 respectively, for urging the valve against the seat member 80.

The valve 67 is opened in the same manner as in the first described form of this invention, there being on the section 68 a valved fitting 86 corresponding to the fitting 24, whereby fluid under pressure greater than the conduit pressure holding the valve seated, may be introduced against the valve to move it into open position shown in full lines in Fig. 12. When the valve 67 is opened in this manner, the carrier is in the retracted position shown in dotted lines in Fig. 12 and may be moved in the passage 70 to dispose the test element 72 in the conduit 74, by introducing through the fitting 79 a fluid pressure greater than the conduit pressure.

A set screw 87, corresponding to the set screw 62 is provided on the body section 69 for releasably holding in the section 69, a plug corresponding to the plug P shown in Fig. 9, when it is desired to replace the valve 67 and its seat 80. As the valve 67 and the seat 80 are mounted on the inner end of the removable body section 68, it is seen that ready access to the valve and the seat for replacement thereof may be had by simply unscrewing the section 68 from the body section 69.

The operation of removing the test element 72 from the conduit 74, into the passage 70, and from the passage, to permit inspection of the test element the same as in the first described form of this invention.

I claim:

1. In apparatus for making tests in a vessel containing fluid under pressure, means for forming a passage having one end opening into said vessel, said passage being adapted for conducting a test element into and out of said vessel, a piston-like carrier operable under fluid pressure in said passage for moving said element into and out of said vessel, valve means operable for closing said passage between its ends as well as for opening and closing said passage between the element therein and said one end of the passage, means for opening and closing the other end of said passage, and means on said carrier operable in said passage responsive to movement of said element into said vessel for releasably engaging said passage forming means to hold said element in said vessel.

2. In apparatus for making tests in a vessel adapted to contain a fluid, means for forming a passage having one end adapted to be communicated with the interior of said vessel for conducting a test element into and out of said vessel, valve means operable for opening and closing said passage between the ends of said passage, a piston operable in said passage having means for attaching thereto a test element, said passage-forming means being dimensioned so that the piston and test element may be mounted therein between said valve means and the other end of said passage, means for opening and closing said other end of said passage, means for introducing fluid under pressure into said passage between said piston and said other end, co-operable latch elements on said piston and said passage forming means respectively contacting one another and releasably holding said piston against movement when said piston reaches a position disposing said test element in said vessel, and means on said passage forming means operable from the exterior thereof for releasing said latch means.

3. In apparatus for making tests in a vessel adapted to contain fluid under pressure, means forming a passage having an open end adapted to be communicated with the interior of said vessel so that fluid from said vessel may enter said passage, a piston in said passage operable as a carrier for moving a test element through said open end into and out of said vessel, valve means operable to open and close said passage between its ends, means for introducing fluid under pressure into said passage for unseating said valve means, and means for applying to said passage fluid under a pressure to move the piston into a position disposing said test element in said vessel when said valve means is unseated.

4. In apparatus for making tests in a vessel adapted to contain fluid under pressure, means forming a passage having an open end adapted to be communicated with the interior of said vessel, a piston in said passage operable as a carrier for moving a test element through said open end into and out of said vessel, valve means operable to open and close said passage between the piston therein and said open end of said passage, means for opening and closing the other end of said passage, means for applying to said passage between said piston and said other end fluid under a pressure to move the carrier into a position disposing said testing element in said vessel, and means operable responsive to movement of said carrier for releasably holding said piston in position to dispose said test element in said vessel, said last named means including latch members on the piston and said passage forming means respectively engaging one another when said piston is moved to said position.

5. In apparatus for making tests in a vessel adapted to contain fluid under pressure, means forming a passage having an open end adapted to be communicated with the interior of said vessel, a carrier for a test element operable as a piston in said passage for moving the test element through said open end into and out of said vessel, valve means operable to open and close said passage between the carrier therein and said open end of said passage, said valve means being arranged to open responsive to fluid pressure applied between the valve means and the carrier, means for opening and closing the other end of said passage, means for introducing into said passage between said valve means and said carrier fluid under pressure for opening said valve means, means for applying to said passage between said carrier and said other end fluid under pressure to move the carrier into a position disposing said testing element in said vessel, means carried by said means for opening and closing the other end of said passage, operable exteriorly of said passage for determining the presence or absence of fluid pressure in said passage between said other end of the passage and said carrier, and means for releasing fluid pressure from said passage.

6. In apparatus for making tests in a pipe line containing fluid under pressure, means forming a passage having two openings, with one said opening adapted to be connected to the pipe line so as to open into the interior of the pipe line for reception of fluid from said pipe line, valve means operable responsive to pressure from said pipe line to maintain said passage closed between said openings, means for opening and closing the other of said openings, piston means operable in said passage responsive to fluid pressure, for moving a test element into and out of said pipe line means for introducing fluid pressure into said passage for so moving said piston, said valve means being arranged to open responsive to fluid under pressure applied between said last named means and said valve means, and means for introducing fluid under pressure for opening said valve means.

7. In apparatus for making tests in a vessel for containing fluid under pressure, means for forming a passage adapted to be connected with said vessel for conducting a test element into and out of said vessel, piston means operable in said passage for moving a test element into and out of said vessel responsive to fluid pressure in said passage, means for introducing fluid pressure into said passage for moving said movable means to position said test element in said vessel, and a valve in said passage operable normally to close said passage; said valve being engageable and held open by said piston means when the latter is moved to dispose said test element in said vessel; said valve closing said passage upon retraction of said piston means to withdraw the test element from said vessel.

8. In apparatus for making tests in a vessel containing fluid, means forming a passage adapted to have one end open into said vessel, a carrier movable responsive to fluid pressure in said passage, means on said carrier for mounting a test element thereon for movement into and out of said vessel, means for introducing fluid under pressure into said passage for moving said carrier to move said test element into said vessel, means for releasably holding said carrier in position in said passage for disposing said test element in said vessel including an expansible snap ring, said carrier having a groove therein in which said ring is compressed, said passage forming means having a groove therein into which said ring expands when said carrier is in said position disposing said test element in said vessel, and means on said passage forming means operable exteriorly thereof for forcing said ring from the groove therein into the groove in said carrier.

9. In apparatus for making tests in a vessel containing fluid under pressure, a tubular body member adapted to be connected with said vessel to form a passage having one end opening into said vessel, a tubular member connected with said passage to form a valve-receiving bore opening at one end into said passage, a carrier for a test element movable as a piston in said passage between a position disposing said test element between the other end of said passage and said bore and a position disposing said test element in said vessel, a valve seat in said passage, a valve movable in said bore into and out of contact with said seat to close and open said passage, a cage supporting said valve, operable as a piston in said bore responsive to fluid pressure applied thereto from said vessel and said bore, means closing said other end of said passage, means closing the other end of said bore, means for introducing into said bore fluid under a pressure which will move said cage into and hold it in a position in said passage whereby said valve may be seated and unseated, said last named means being operable to relieve the pressure being introduced thereby into said bore whereby the fluid pressure from said vessel will move said cage out of said position, means for introducing fluid under pressure into said passage for unseating said valve while said cage is in said position, and means for introducing fluid under pressure into said passage for moving said carrier into position disposing said test element in said vessel.

10. In apparatus for making tests in a vessel containing fluid under pressure, a tubular body member adapted to be connected with said vessel to form a passage having one end opening into said vessel, a tubular member connected with said passage to form a valve-receiving bore opening at one end into said passage, a carrier for a test element movable as a piston in said passage between a position disposing said test element between the other end of said passage and said bore and a position disposing said test element in said vessel, a valve seat in said passage, a valve movable into and out of contact with said seat to close and open said passage, a cage supporting said valve operable as a piston in said bore, means closing said other end of said passage, means closing the other end of said bore, means for introducing fluid under pressure into said bore for moving said cage to a position in said passage in which said valve may be seated by pressure in said passage derived from said vessel, said last named means being operable to relieve the pressure introduced thereby, means for introducing fluid under pressure into said passage for unseating said valve while said cage is in said position, and means for introducing fluid under pressure into said passage for moving said carrier into position disposing said test element in said vessel including provision for relieving the fluid pressure between said carrier and said other end of said passage whereby the fluid pressure in said vessel will be effective to move said carrier into position to withdraw said element from said vessel.

11. In apparatus for making tests in a vessel containing fluid under pressure, a tubular body member adapted to be connected with said vessel to form a passage having one end opening into said vessel, a tubular member connected with said passage to form a valve-receiving bore opening at one end into said passage a carrier for a test element, movable as a piston in said passage between a position disposing said test element between the other end of said passage and said bore and a position disposing said test element in said vessel, a valve seat in said passage, a valve movable into and out of contact with said seat to close and open said passage, a cage supporting said valve operable as a piston in said bore, removable closure means for said other end of said passage, means operable exteriorly of said passage to determine the presence or absence of fluid pressure in said passage between said carrier and said closure means, means closing the other end of said bore, means for introducing fluid under pressure into said bore for moving said cage to a position in said passage in which said valve may be seated by pressure in said passage derived from said vessel, said last named means being operable to relieve the fluid pressure introduced thereby, means for introducing fluid under pressure against said valve to unseat it, and means for introducing fluid under pressure into said passage to move said carrier to position said test element in said vessel including means for relieving such pressure from said passage to permit the pressure of fluid from said vessel to move said carrier to withdraw the test element from said passage, the removal of said removable closure means affording access to said carrier for withdrawal thereof from said passage for inspection of said test element.

12. In apparatus for making tests in a vessel containing fluid under pressure, a tubular body member adapted to be connected with said vessel to form a passage having one end opening into said vessel, a tubular member connected with said passage to form a valve-receiving bore opening at one end into said passage, a carrier for a test element movable as a piston in said passage between a position disposing said test element between the other end of said passage and said bore and a position disposing said test element in said vessel, a valve seat in said passage, a valve movable into and out of contact with said seat to close and open said passage, a cage supporting said valve operable as a piston in said bore, means closing said other end of said passage, means closing the other end of said bore, means for introducing fluid under pressure into said bore for moving said cage to a position in said passage permitting said valve to be seated by the pressure in said passage derived from said vessel, means for introducing fluid under pressure into said passage for unseating said valve, and means for introducing fluid under pressure into said passage for moving said carrier into position disposing said test element in said vessel, each of said means for introducing pressure fluid into said passage including provision for relieving the pressure from said passage, the means for introducing pressure fluid into said bore also including means for relieving the pressure from said bore.

13. In apparatus for making tests in a vessel adapted to contain fluid under pressure, means forming a passage having one end adapted to be communicated with the interior of said vessel, a carrier for a test element movable in said passage responsive to fluid pressure for positioning said test element within and removing it from said vessel, valve means operable to open and close said passage between said carrier and said vessel, means including latch elements on said carrier and within said passage engaging one another responsive to movement of said carrier into position to dispose said test element in said vessel for releasably holding said carrier in said position, and means on said passage forming means operable exteriorly thereof for releasing said holding means.

14. In apparatus for making tests in a vessel adapted to contain fluid under pressure, means forming a passage having one end adapted to be communicated with the interior of said vessel, a carrier for a test element movable in said passage for positioning said test element within and removing it from said vessel, means removably mounted on said passage-forming means for closing the other end of said passage, said carrier having a head portion operable as a piston in said passage, valve means in said passage operable to open said passage responsive to fluid pressure and to close said passage responsive to movement of said carrier, means providing for the introduction of fluid pressure into said passage between said head portion and said closure means, means for introducing into said passage at a point between said head portion and said valve means a fluid pressure for opening said valve.

15. In apparatus for use in connection with a vessel containing fluid under pressure, said vessel having an opening therein affording access to the interior thereof, a tubular body forming a passage open at the ends of said body, said body having one end adapted to be connected with said vessel for communicating one end of said passage with the opening in said vessel, a closure for the other end of said passage removably mounted on said body, said passage providing for the insertion of a test element through said opening into said vessel and for the removal of said test element, valve means removably mounted in said passage between the ends of said body operable for opening and closing said passage, a plug operable as a piston in said passage for movement into and out of a position for closing said passage between the opening in said vessel and said valve means whereby the valve means may be removed while said body is connected with said vessel, means for introducing fluid under pressure into said passage between said plug and said closure and means for releasably holding said plug in position closing said passage.

16. Apparatus for use in connection with a vessel containing fluid under pressure, said vessel having an opening therein, a tubular body formed of a pair of detachably connected sections providing a passage opening at the ends of said body, said body having one end of one of said sections adapted for connection within said vessel to communicate one end of said passage with said opening, a closure removably mounted on said body for closing the other end of said passage, said passage providing for the insertion of a test element through said opening into said vessel as well as for removal of said element, valve means carried by the other of said sections operable for opening and closing said passage between the ends thereof and being removable upon detaching said other section from said one section while the latter is connected with said vessel, a plug operable as a piston in said passage for movement into and from a position closing the passage between the valve means and said opening preliminary to detachment of said other section, means for introducing fluid under pressure into said passage between said plug and said closure for moving said plug into said position, and means for releasably holding said plug in said passage.

17. Apparatus for making tests in a vessel containing fluid under pressure, said vessel having an opening therein, a tubular body formed of a pair of detachably connected coaxial sections providing a passage opening at the ends of said body, said body having one end of one of said sections adapted for connection with said vessel to communicate one end of said passage with said opening, a closure removably mounted on the other section for closing the other end of said passage, said passage providing for the insertion of a test element through said opening into said vessel as well as for removal of said element, a flap valve pivotally mounted on said other section within said passage, a seat for said valve on said other section, spring means urging said valve against said seat, and means for introducing into said other section a fluid pressure for opening said valve against the force of the fluid pressure effective against said valve from said vessel.

18. Apparatus for making tests in a vessel containing fluid under pressure, said vessel having an opening therein, a tubular body formed of a pair of detachably connected sections providing a passage opening at the ends of said body, said body having one end of one of said sections adapted for connection with said vessel to communicate one end of said passage with said opening, a closure removably mounted on the other section for closing the other end of said passage, said passage providing for the insertion of a test element through said opening into said vessel as well as for removal of said element, a flap valve pivotally mounted on said other section within said passage, a seat for said valve on said other section, spring means urging said valve against said seat, and means providing for the introduction of fluid into said passage under a pressure for unseating said valve against the force of said spring and the pressure of the fluid in said vessel, and a carrier for the test element movable in said passage into and out of a position for engaging said valve to hold it unseated.

19. Apparatus for making tests in a vessel containing fluid under pressure comprising: a tubular member having one end adapted to be connected to the vessel to communicate the bore of said tubular member with the interior of the vessel; a valve seat in said bore; a valve mounted in said bore so as to be urged against the seat by the pressure of fluid from said vessel; a piston-like carrier for a test element movable in said bore; said carrier and test element being movable in said bore between a first position in which the carrier and test element are disposed between the valve seat and the other end of said tubular member, and a second position in which the test element is disposed in said vessel; a first means on the tubular member between the valve seat and said other end of said tubular member for introducing fluid under pressure into said bore to create against said valve a fluid pressure opposing the fluid pressure urging the valve against said seat; and a second means on said tubular member between said first means and said other end of said tubular member for introducing fluid under pressure into said bore for moving said carrier into said second position.

20. Apparatus for making tests in a vessel containing fluid under pressure comprising: a tubular member having one end adapted to be connected to the vessel to communicate the bore of said tubular member with the interior of the vessel; a valve seat in said bore; a valve mounted in said bore so as to be urged against the seat by the pressure of fluid from said vessel; a piston-like carrier for a test element movable in said bore; said carrier and test element being movable in said bore between a first position in which the carrier and test element are disposed between the valve seat and the other end of said tubular member, and a second position in which the test element is disposed in said vessel; a first means on the tubular member between the valve seat and said other end of said tubular member for introducing fluid under pressure into said bore to create against said valve a fluid pressure opposing the fluid pressure urging the valve against said seat; a second means on said tubular member between said first means and said other end of said tubular member for introducing fluid under pressure into said bore for moving said carrier into said second position; and elements on said carrier and tubular member respectively, engaging one another responsive to fluid-pressure effected movement of said carrier, to releasably lock said carrier in said second position.

21. Apparatus for making tests in a vessel containing fluid under pressure comprising: a tubular member having one end adapted to be connected to the vessel to communicate the bore of said tubular member with the interior of the vessel; a valve seat in said bore; a valve mounted in said bore so as to be urged against the seat by the pressure of fluid from said vessel; a piston-like carrier for a test element movable in said bore; said carrier and test element being movable in said bore between a first position in which the carrier and test element are disposed between the valve seat and the other end of said tubular member, and a second position in which the test element is disposed in said vessel; a first means on the tubular member between the valve seat and said other end of said tubular member for introducing fluid under pressure into said bore to create against said valve a fluid pressure opposing the fluid pressure urging the valve against said seat; a second means on said tubular member between said first means and said other end of said tubular member for introducing fluid under pressure into said bore for moving said carrier into said second position; said carrier contacting and holding said valve unseated when moved from said first position to said second position and releasing said valve upon movement into said first position; and spring means operatively connected with said tubular member and said valve operable to seat said valve upon movement of said carrier from said second position to said first position.

22. Apparatus for making tests in a vessel containing fluid under pressure comprising: a tubular member having one end adapted to be connected to the vessel to communicate the bore of said tubular member with the interior of the vessel; a valve seat in said bore; a valve mounted in said bore so as to be urged against the seat by the pressure of fluid from said vessel; a piston-like carrier for a test element movable in said bore; said carrier and test element being movable in said bore between a first position in which the carrier and test element are disposed between the valve seat and the other end of said tubular member, and a second position in which the test element is disposed in said vessel; a first means on the tubular member between the valve seat and said other end of said tubular member for introducing fluid under pressure into said bore to create against said valve a fluid pressure opposing the fluid pressure urging the valve against said seat; and a second means on said tubular member between said first means and said other end of said tubular member for introducing fluid under pressure into said bore for moving said carrier into said second position; said first means being operable to relieve fluid pressure from said bore.

23. Apparatus for making tests in a vessel containing fluid under pressure comprising: a tubular member having one end adapted to be connected to the vessel to communicate the bore of said tubular member with the interior of the vessel; a valve seat in said bore; a valve mounted in said bore so as to be urged against the seat by the pressure of fluid from said vessel; a piston-like carrier for a test element movable in said bore; said carrier and test element being movable in said bore between a first position in which the carrier and test element are disposed between the valve seat and the other end of said tubular member, and a second position in which the test element is disposed in said vessel; a first means on the tubular member between the valve seat and said other end of said tubular member for introducing fluid under pressure into said bore to create against said valve a fluid pressure opposing the fluid pressure urging the valve against said seat; and a second means on said tubular member between said first means and said other end of said tubular member for introducing fluid under pressure into said bore for moving said carrier into said second position; said first means and said second means being operable to relieve fluid pressure from said bore.

24. Apparatus for making tests in a vessel containing fluid under pressure comprising: a tubular member having one end adapted to be connected to the vessel to communicate the bore of said tubular member with the interior of the vessel; a valve seat in said bore; a valve mounted in said bore so as to be urged against the seat by the pressure of fluid from said vessel; a piston-like carrier for a test element movable in said bore; said carrier and test element being movable in said bore between a first position in which the carrier and test element are disposed between the valve seat and the other end of said tubular member, and a second position in which the test element is disposed in said vessel; a first means on the tubular member between the valve seat and said other end of said tubular member for introducing fluid under pressure into said bore to create against said valve a fluid pressure opposing the fluid pressure urging the valve against said seat; a second means on said tubular member between said first means and said other end of said tubular member for introducing fluid under pressure into said bore for moving said carrier into said second position; said carrier contacting and holding said valve unseated when moved from said first position to said second position and releasing said valve upon movement into said first position; and spring means operatively connected with said tubular member and said valve operable to seat said valve upon movement of said carrier from said second position to said first position; said first means and said second means being operable to relieve fluid pressure from said bore.

25. Apparatus for making tests in a vessel for containing fluid under pressure comprising: a tubular member including a pair of tubular sections detachably joined in end to end relation and providing a bore; one of said sections being adapted to be connected with the vessel to communicate the interior of the vessel with said bore; a valve seat in the bore of the other section; a valve movably mounted in said other section so as to be urged against said seat by pressure of fluid directed through said bore from said vessel; spring means biasing said valve toward said seat; a piston-like carrier for a test element mounted in said bore; said carrier and element being movable in said bore between a first position in which the carrier and element are disposed between said seat and the outer end of said other section, and a second position in which said element is disposed in said vessel; said valve being engaged by said carrier and held in open position upon movement of said carrier into said second position; said valve being released upon movement of said carrier into said first position; a first means on said other section between said valve seat and said outer end for introducing into said bore a fluid pressure to create against said valve a fluid pressure opposing the fluid pressure urging said valve against said seat; and a second means on said other section between said first means and said outer end for introducing into said bore between said carrier and said outer end a fluid pressure for moving said carrier into said second position.

26. Apparatus for making tests in a vessel for containing fluid under pressure comprising: a tubular member including a pair of tubular sections detachably joined in end to end relation and providing a bore; one of said sections being adapted to be connected with the vessel to communicate the interior of the vessel with said bore; a valve seat in the bore of the other section; a valve movably mounted in said other section so as to be urged against said seat by pressure of fluid directed through said bore from said vessel; spring means biasing said valve toward said seat; a piston-like carrier for a test element mounted in said bore; said carrier and element being movable in said bore between a first position in which the carrier and element are disposed between said seat and the outer end of said other section, and a second position in which said element is disposed in said vessel; said valve being engaged by said carrier and held in open position upon movement of said carrier into said second position; said valve being released upon movement of said carrier into said first position; a first means on said other section between said valve seat and said outer end for introducing into said bore a fluid pressure to create against said valve a fluid pressure opposing the fluid pressure urging said valve against said seat; a second means on said other section between said first means and said outer end for introducing into said bore between said carrier and said outer end a fluid pressure for moving said carrier into said second position; and locking elements on said carrier and one of said sections respectively, cooperable responsive to fluid pressure-effected movement of said carrier to lock said carrier in said second position.

27. In apparatus of the character described; a tubular member having one end adapted to be connected with a vessel containing fluid under pressure; a valve seat in said tubular member; a valve mounted in said tubular member to move against said seat in a direction away from said end of said tubular member; said tubular member being adapted to have a piston-like carrier inserted through the other end thereof for movement therein between a first position in which one end of the carrier is disposed between said seat and said other end of said tubular member, and a second position in which said one end of said carrier is disposed between said valve seat and said vessel; means for sealing said other end of said tubular member; a first means on said tubular member between said seat and said other end of said tubular member for introducing into said tubular member fluid pressure for applying a force against said valve in the direction in which said valve is unseated; and a second means on said tubular member between said first means and said other end of said tubular member for introducing fluid under pressure for moving the piston-like carrier from said first position into said second position.

28. In apparatus of the character described; a tubular member having one end adapted to be connected with a vessel containing fluid under pressure; a valve seat in the bore of said tubular member; a valve mounted in said bore to move against said seat in a direction away from said end of said tubular member; a piston-like carrier mounted in said bore for movement between a first position in which one end of said carrier is disposed between said valve seat and the other end of said tubular member, and a second position in which said one end of said carrier is disposed between said seat and said vessel; means for sealing said other end of said tubular member; a first means on said tubular member between said seat and said other end of said tubular member for introducing fluid under pressure into said bore to apply a force against said valve in the direction in which said valve is unseated; a second means on said tubular member between said first means and said other end for introducing fluid under pressure into said bore to move said carrier from said first position into said second position; said carrier holding said valve open when moved into said second position; and spring means operable to seat said valve when said carrier is in said first position.

29. In apparatus of the character described; a tubular member having one end adapted to be connected with a vessel containing fluid under pressure; a valve seat in the bore of said tubular member; a valve mounted in said bore to move against said seat in a direction away from said end of said tubular member; a piston-like carrier mounted in said bore for movement between a first position in which one end of said carrier is disposed between said valve seat and the other end of said tubular member, and a second position in which said one end of said carrier is disposed between said seat and said vessel; means for sealing said other end of said tubular member; a first means on said tubular member between said seat and said other end of said tubular member for introducing fluid under pressure into said bore for applying a force against said valve in the direction in which said valve is unseated; a second means on said tubular member between said first means and said other end for introducing fluid under pressure into said bore to move said carrier from said first position into said second position; said carrier holding said valve open when moved into said second position; and spring means operable to seat said valve when said end of said carrier is in said first position; said second means being operable to relieve fluid pressure from said bore.

References Cited in the file of this patent

UNITED STATES PATENTS

| | | |
|---|---|---|
| 424,547 | Flad | Apr. 1, 1890 |
| 1,769,463 | Rice | July 1, 1930 |
| 1,833,700 | Wolf | Nov. 24, 1931 |
| 1,966,712 | Fisher et al. | July 17, 1934 |
| 2,035,472 | Hammond | Mar. 31, 1936 |
| 2,096,288 | Nelson | Apr. 23, 1937 |
| 2,250,244 | Yancey | July 22, 1941 |
| 2,398,958 | Pellettere | Apr. 23, 1946 |

FOREIGN PATENTS

| | | |
|---|---|---|
| 654,851 | Great Britain | Feb. 11, 1948 |